United States Patent [19]

Akiyama et al.

[11] Patent Number: 4,548,774

[45] Date of Patent: Oct. 22, 1985

[54] METHOD FOR PREPARING A SIC WHISKER-REINFORCED COMPOSITE MATERIAL

[75] Inventors: Masaru Akiyama, Ibaraki; Jotaro Yamada, Nagoya; Masaya Takahata, Fujisawa, all of Japan

[73] Assignee: Tokai Carbon Co., Ltd., Tokyo, Japan

[21] Appl. No.: 515,134

[22] Filed: Jul. 19, 1983

[30] Foreign Application Priority Data

Jul. 28, 1982 [JP] Japan .................... 57-130293

[51] Int. Cl.$^4$ .................... B22D 19/14; B29G 1/00
[52] U.S. Cl. .................... 264/44; 164/97; 264/137; 264/257; 427/243
[58] Field of Search .................... 264/44, 137, 257; 427/243; 156/DIG. 112; 164/91, 97, 99, 79, 110; 423/345

[56] References Cited

U.S. PATENT DOCUMENTS 3,653,851  4/1972  Gruber .................... 423/345 X
4,279,289  7/1981  Ban et al. .................... 164/97

FOREIGN PATENT DOCUMENTS 791567   3/1958  United Kingdom .
796792   6/1958  United Kingdom .
916577   1/1963  United Kingdom .
1254732 11/1971  United Kingdom .
1475193  6/1977  United Kingdom .

Primary Examiner—Evan K. Lawrence
Attorney, Agent, or Firm—Birch, Stewart, Kolasch & Birch

[57] ABSTRACT

The invention provides a method for preparing a SiC whisker-reinforced composite material. A matrix material such as a metal, an alloy or a plastic is introduced into a fibrous base consisting of a SiC whisker sponge-like cake. The resultant structure is compressed into a desired shape as needed. The fibrous base is prepared by heating a mixture of silica gel or ashed rice hulls with a furnace carbon black and an additional amount of NaCl as a space forming agent for forming spaces conducive to whisker growth.

7 Claims, No Drawings

METHOD FOR PREPARING A SIC WHISKER-REINFORCED COMPOSITE MATERIAL

BACKGROUND OF THE INVENTION

The present invention relates to a method for preparing a SiC whisker-reinforced composite material and, more particularly, to a method for preparing a high performance composite material by reinforcing a matrix material such as a metal, an alloy or a plastic with SiC whiskers.

SiC whiskers have high strength, elastic modulus, heat resistance and chemical stability, and also have excellent wetting properties with a matrix material. They have therefore been regarded as a most promising reinforcing material for metals and plastics. However, they have not yet been used as a reinforcing material for metals or plastics in a practical sense. The major technical factor which has prevented such use is the difficulty in achieving a uniform mixture and dispersion of SiC whiskers in a matrix material. SiC whiskers are prepared by subjecting a mixture of an $SiO_2$-containing powder with a carbonaceous material to a gas-phase reaction in an inert atmosphere within a temperature range of 1,400° to 2,000° C. However, the reaction product of this process has a cake-like structural form in which dense groups of microscopic SiC whiskers are entangled with each other in a random manner and hard to separate. A difficulty thus arises in uniformly dispersing such SiC whiskers in a matrix material.

For example, when the powder metallurgy method, as proposed in U.K. Pat. No. 1590728, is adopted for the SiC whiskers, a complex disintegration step is required to allow their uniform dispersion in the matrix material. Furthermore, since these SiC whiskers are extremely short, the conventional composite method for long fibers such as carbon fibers may not be adopted.

SUMMARY OF THE INVENTION

The present inventors have noted the fact that SiC whiskers can be transformed into a sponge-like cake form having an extremely uniform pore distribution, depending upon the reaction system selected. Based upon this fact, the present inventors have made extensive studies and have developed a technique for utilizing such a cake form as a fibrous base without disintegrating it.

Unlike the conventional method wherein SiC whiskers are mixed and dispersed in a matrix material, in accordance with the method for preparing a SiC whisker-reinforced composite material according to the present invention, a matrix material is introduced into a fibrous base comprising a sponge-like cake form of SiC whiskers, and the mixture is compressed into a desired shape as needed. The method of the present invention does not require the complex disintegration step for a SiC whisker cake and provides a SiC whisker-reinforced composite material which has both uniform strength and high performance.

DETAILED DESCRIPTION OF THE PREFERRED EMBODIMENTS

A SiC whisker sponge-like cake to be used as the fibrous base herein may be preferably prepared in the following manner using as a silicon source a silica gel or ashed rice hulls containing 6.0 to 25.0% by weight of a water-soluble compound of Fe, Ni or Co with respect to the Si content. The silicon source is mixed with a furnace carbon black.(carbonaceous material) having an aggregated structure and a DBP (dibutyl phthalate) absorption number of 50 ml/100 g or more, and with an additional amount of NaCl as a space forming agent to form spaces conductive to whisker growth due to its boiling action, as disclosed in copending, commonly owned application Ser. No. 460,796, filed on Jan. 25, 1983, now U.S. Pat. No. 4,500,504. The resultant mixture is lightly packed in a sealed reaction vessel and is heated to a temperature of 1,300° to 1,700° C. in a non-oxidizing atmosphere. Thereafter, the residual carbonaceous material is burnt away. The amount of water-soluble compound of Fe, Ni or Co in the silica gel or ashed rice hulls is determined to be within the range of 6.0 to 25.0% by weight based on the Si content for the following reasons. When the amount of the water-soluble compound is less than 6.0% by weight, the proportion of the compound which remains as granular SiC without promoting the growth of SiC whisker crystals increases. On the other hand, when the amount of the water-soluble compound exceeds 25.0% by weight, the length of the whiskers becomes nonuniform and impairs the uniformity of the aspect ratio. Furthermore, the DBP absorption number of the furnace carbon black to be used is 50 ml/100 g or more, because the use of a carbon black having a DBP absorption number of less than 50 ml/100 g results in undesirable properties of the SiC whiskers and a low whisker yield. The heating temperature is within the range of 1,300 to 1,700° C. for the following reasons. When the heating temperature is lower than 1,300° C., formation of the SiC whiskers is difficult; however, when the heating temperature exceeds 1,700° C., the aspect ratio of the resultant SiC whiskers is lowered, so that only brittle short fibers of a large diameter may be obtained.

A sponge-like cake form which results in a composite material having the best performance is a structure comprising β-SiC single crystals which have a diameter of 0.2 to 1.0 μm and an aspect ratio of 100 or more and which are uniformly entangled in a random manner. Such a cake form may be obtained by setting the mixing ratio of the reaction starting materials (the ratio of the silicon source to the carbonaceous material to the NaCl) to be within the range of 1 : 1.1 : 0.8 to 1 : 1.5 : 1.0. A preformed grown cake obtained with such a mixing ratio has a structure with an extremely uniform pore distribution; it also has a bulk density of 0.03 to 0.05 $g/cm^3$ and a porosity of 98.1 to 98.7%. Accordingly, such a cake can be used directly as a fibrous base of the present invention. However compression of such a grown cake to a given density allows control of the volume fraction (Vf value) with respect to the composite material to within a predetermined range. However, if the compression ratio is excessively high, the SiC whiskers break and the introduction of a matrix material into the SiC whisker cake becomes difficult. Accordingly, the bulk density of the cake is preferably up to 1.9 $g/cm^3$. A cake of a shape conforming to the inner surface of a reaction vessel is obtained. In view of this fact, by selecting a predetermined shape for the inner surface of the reaction vessel, a preformed grown cake having the same shape as that of the final composite material may be obtained and may be compressed into a fibrous base of a desired shape in the compressing step.

A matrix material which may be used herein may be a metal such as Mg, Al, Si, Ti, Cr, Mn, Fe, Co, Ni, Cu, Zn, Ag, Ta or W, or an alloy thereof; or various types of plastics such as an epoxy resin, a polyester resin, a phenol resin, a polyimide resin, or a urea resin.

By using liquid forms (the molten state in the case of a metal or an alloy thereof), such a matrix material may be introduced into the fibrous base of a sponge-like cake by impregnation, coating, melt spraying, or vapor deposition into the fibrous base. If the coating, melt spraying or vapor deposition methods are to be adopted, a sponge-like cake as the fibrous base is preferably formed into a thin shape or sliced into thin sheets.

The composite material thus obtained may be compressed into a desired shape in a single layer or in a laminated form by a suitable means such as hot rolling, hot pressing, or isotactic pressing.

A SiC whisker-reinforced composite material thus obtained has a uniform and isotropic structure wherein a matrix material is strongly introduced into uniform pores defined between random SiC whiskers. The composite material thus has a high composite reinforcing performance.

According to the present invention, a uniform and strong SiC whisker-reinforced composite material having a desired Vf value may be obtained quickly without requiring the disintegration of a SiC whisker growing cake, which is a difficult, complex procedure. Furthermore, mass-production of composite materials may be facilitated for building or functional materials in a wide range of fields such as aircraft turbines, vehicle engines, construction or the leisure industry, resulting in obvious industrial advantages.

EXAMPLE 1

A silicon source used was 100 parts by weight of a silica gel fine powder ($SiO_2$ 99.5%; 200 mesh or less) containing 7.0% by weight of $CoCl_2 \cdot 6H_2O$. The silicon source was uniformly mixed with 110 parts by weight of an IISAF-high structure (Hs) class furnace carbon black (a carbonaceous material; "SEAST 5H" manufactured by Tokai Carbon Co., Ltd.) having a DBP absorption number of 130 ml/100 g and an iodine absorption number of 104 mg/g, and with 90 parts by weight of NaCl (a space forming agent). A sponge-like cake of SiC whiskers was obtained in the following manner.

The starting material mixture was lightly packed in a high purity graphite reaction vessel having an inner diameter of 100 mm and a height of 250 mm. After placing a graphite lid on top of the vessel, the vessel was put in an Acheson type electric furnace and was surrounded by coke powder packing. The furnace was heated to perform a heat treatment in a nonoxidizing atmosphere at 1,600° C. for 4 hours. After the heat treatment, the contents of the vessel were removed therefrom without causing disintegration. The mixture was then subjected to another heat treatment in ambient air at 700° C. so as to burn away the residual carbonaceous material. The resultant sponge-like cake had a uniform dense structure which had a diameter of 100 mm and a height of 200 mm, and in which pure SiC whiskers were entangled with each other in a random manner. The SiC whiskers consisted of $\beta$-type single crystals each having a diameter of 0.2 to 0.5 $\mu$m and a length of 100 to 200 $\mu$m. The overall structure had a true specific gravity of 3.17 g/cm$^3$, a bulk density of 0.04 g/cm$^3$, and an average porosity of 98.7%.

The sponge-like cake was placed in a cylindrical mold having an inner diameter of 100 mm and was compressed vertically to a thickness of 20 mm. The sponge-like cake after compression had a bulk density of 0.4 g/cm$^3$ and an average porosity of 87%.

The sponge-like cake as a fibrous base was infiltrated both before and after compression with a molten aluminum alloy (2024) at a pressure of 1 ton/cm$^2$ by the infiltration method, and was then hot-pressed.

The strength characteristics of the resultant SiC whisker-reinforced Al composite materials are shown in Table 1 below.

TABLE 1

| Fibrous base | Vf (%) | Tensile strength (kg/mm$^2$) | Flexural strength (kg/mm$^2$) | Elastic modulus (ton/mm$^2$) |
|---|---|---|---|---|
| Before compression | 1.3 | 35 | 40 | 8.0 |
| After compression | 13.0 | 45 | 50 | 8.8 |
| Control | 0 | 33 | — | 7.5 |

It may be seen from the table above that the composite materials according to the present invention have a sufficiently reinforced isotropic structure which is free from local variations in characteristics due to nonuniformity of SiC whisker distribution.

EXAMPLES 2 to 11

A silica gel fine powder ($SiO_2$ 99.5%) having a particle size of 200 mesh or less was immersed in aqueous solutions of $FeCl_2 \cdot 4H_2O$ or $Ni(NO_3)_2 \cdot 6H_2O$, as a water-soluble compound, of different concentrations, and was then dried by heating in order to prepare silicon source. To 100 parts by weight of each resultant silicon source a furnace carbon black (a carbonaceous material; "SETAST KH" manufactured by Tokai Carbon Co., Ltd.) was added in various amounts, having a DBP absorption number of 119 ml/100 g and a iodine absorption number of 90 mg/g. Furthermore, an NaCl powder (a space forming agent) was added in the amount of 100 parts by weight based on 100 parts by weight of the silica gel, and was uniformly mixed therewith.

Sponge-like SiC whisker growing cakes were obtained for each of the raw materials prepared in this manner under conditions identical to those of Example 1. Each of the resultant cakes had a dense structure wherein $\beta$-SiC needle-like microscopic single crystals were entangled with each other in a random manner. However, they had different properties in accordance with the mixing ratio of the raw materials. Each of such SiC whisker growing cakes was compressed isotropically to adjust the Vf value to 10%. Using such a cake as a fibrous base, an FRM of an Al alloy (2024) matrix was prepared following procedures similar to those in Example 1 above.

The mixing ratios of the raw materials and the properties of the resultant SiC whisker preformed growing cakes and FRMs are shown in Table 2 below.

TABLE 2

| | Water-soluble compound | | Carbonaceous material content (parts by weight) | SiC whisker properties | | FRM characteristics (n = 5) | | | |
|---|---|---|---|---|---|---|---|---|---|
| | | | | | | Tensile strength (kg/mm$^2$) | | Elastic modulus (ton/mm$^2$) | |
| Sample | Compound formula | Content* (wt %) | | Diameter (μm) | Aspect ratio | Average value (X̄) | standard deviation (σ) | Average value (X̄) | Standard deviation (σ) |
| Example 2 | FeCl$_2$.4H$_2$O | 6.0 | 150 | 0.1–0.5 | 200–800 | 43.1 | 4.1 | 8.7 | 0.2 |
| Example 3 | FeCl$_2$.4H$_2$O | 10.0 | 130 | 0.2–0.5 | 300–800 | 44.6 | 3.5 | 8.5 | 0.2 |
| Example 4 | FeCl$_2$.4H$_2$O | 25.0 | 130 | 0.2–0.5 | 300–800 | 43.8 | 2.7 | 8.5 | 0.4 |
| Example 5 | FeCl$_2$.4H$_2$O | 4.0 | 130 | 0.1–0.5 | 100–300 | 39.2 | 4.2 | 7.9 | 0.3 |
| Example 6 | FeCl$_2$.4H$_2$O | 30.0 | 160 | 0.1–0.5 | 50–200 | 42.3 | 7.5 | 8.4 | 0.7 |
| Example 7 | Ni(NO$_3$)$_2$.6H$_2$O | 6.0 | 120 | 0.2–0.5 | 100–200 | 42.5 | 2.0 | 8.6 | 0.1 |
| Example 8 | Ni(NO$_3$)$_2$.6H$_2$O | 10.0 | 120 | 0.3–0.5 | 200–300 | 43.1 | 1.6 | 8.3 | 0.2 |
| Example 9 | Ni(NO$_3$)$_2$.6H$_2$O | 25.0 | 130 | 0.3–0.5 | 200–400 | 44.3 | 2.4 | 8.5 | 0.4 |
| Example 10 | Ni(NO$_3$)$_2$.6H$_2$O | 1.0 | 160 | 0.1–0.5 | 100–200 | 38.8 | 2.3 | 8.0 | 0.2 |
| Example 11 | Ni(NO$_3$)$_2$.6H$_2$O | 30.0 | 130 | 0.1–0.5 | 100–400 | 41.5 | 8.4 | 8.1 | 0.8 |

Note: *indicates the % by weight based on the Si content of the silica gel.

EXAMPLE 12

Dried rice hulls were kept at a temperature of 600° C. so as to be burnt to a constant weight in order to obtain ashed rice hulls (SiO$_2$ content: 91.9%). The ashed rice hulls thus obtained were mixed with 10% by weight of CoCl$_2$0.6H$_2$O based on Si content to obtain a silicon source. To 100 parts by weight of this silicon source were added 120 parts by weight of an HAF class furnace carbon black (a carbonaceous material; "SEAST 3" manufactured by Tokai Carbon Co., Ltd.) which had a DBP absorption number of 102 ml/100 g and an iodine absorption number of 80 mg/g, and 90 parts by weight of an NaCl powder as a space forming agent, based on the ashed rice hulls. The components were uniformly mixed.

The mixture was treated in the same manner as in Example 1 above to prepare a sponge-like cake consisting of β-SiC whiskers. The sponge-like whisker cake was isotropically compressed from its outer surface to a high density having the volume fraction (Vf value) of 18%.

The preformed SiC whisker cake was impregnated with a molten pure Al under a pressure of 1 ton/cm$^2$ so as to obtain an SiC whisker-reinforced Al composite material.

The obtained composite material showed a tensile strength of 30 kg/mm$^2$ and an elastic modulus of 10 ton/mm$^2$.

EXAMPLE 13

The SiC whisker growing cake obtained in Example 1 was sliced into sheets 5 mm thick. The two surfaces of each sheet were coated with a phenol-formaldehyde prepolymer. Three such sheets were laminated together, and the laminate was rolled at 170° C. between rolls having a gap of 5 mm and was then cured at a temperature of 170° C.

The obtained SiC whisker-reinforced composite material had high performance strength characteristics: a tensile strength of 7.0 kg/mm$^2$ and an elastic modulus of 0.9 ton/mm$^2$.

EXAMPLE 14

An SiC whisker growing cake obtained in a similar manner to that obtained in Example 1 above was subjected to vacuum impregnation with an epoxy resin solution. The cake was then placed in a cylindrical mold having an inner diameter of 100 mm, and was compressed to a thickness of 12.6 mm. After squeezing out the excess resin, the mold was held stationary and was cured at 150° C.

The obtained SiC whisker-reinforced epoxy resin composite material had a SiC whisker volume content of 20% and high performance strength characteristics: a tensile strength of 14 kg/mm$^2$ and an elastic modulus of 1.2 ton/mm$^2$.

What I claim is:

1. A method for preparing a SiC whisker-reinforced composite material, comprising the steps of:
   preparing the fibrous base of a SiC whisker sponge-like cake by mixing a silica gel or ashed rice hulls, said silica gel or ashed rice hulls being a silicon source and containing 6.0 to 25.0% by weight of a water-soluble compound selected from the group consisting of Fe, Ni and Co, based on the Si content, with a furnace carbon black having an aggregated structure and a DBP absorption number of 50 ml/100 g or more as a carbonaceous material and with an additional amount of NaCl as a space forming agent,
   lightly packing the resultant mixture in a sealed reaction vessel,
   heating the mixture to a temperature of 1,300° to 1,700° C. in a nonoxidizing atmosphere, and
   burning away the residual carbonaceous material to obtain said fibrous base of said cake; and
   introducing a matrix material selected from the group consisting of a metal, an alloy and a plastic into the fibrous base of the SiC whisker sponge-like cake.

2. The method according to claim 1, wherein the fibrous base of the SiC whisker sponge-like cake comprises a cake wherein β-SiC single crystals each having a diameter of 0.2 to 1.0 μm and an aspect ratio of 100 or more are entangled with each other in a random manner.

3. The method according to claim 2, wherein the cake is compressed to have a bulk density of 0.03 to 1.9 g/cm$^3$ prior to introduction of said matrix material.

4. The method according to claim 1, wherein the mixing ratio of the silicon source to the carbonaceous material to the NaCl is within a range of 1 : 1.1 : 0.8 to 1 : 1.5 : 1.0.

5. The method according to claim 1, wherein the matrix material is at least one member selected from the group consisting of magnesium, aluminum, silicon, titanium, chromium, manganese, iron, cobalt, nickel, copper, zinc, silver, tantalum, tungsten, and alloys thereof.

6. The method according to claim 1, wherein the matrix material is at least one member selected from the group consisting of an epoxy resin, a polyester resin, a phenol resin, a polyimide resin, and a urea resin.

7. The method according to claim 1, wherein after the matrix material is introduced into the fibrous base of the SiC whisker sponge-like cake, the sponge-like cake is compressed to have a desired volume fraction and shape.

* * * * *